J. BRAUNSTEIN.
FLUID HEATER.
APPLICATION FILED JUNE 5, 1919.
1,356,427.
Patented Oct. 19, 1920.
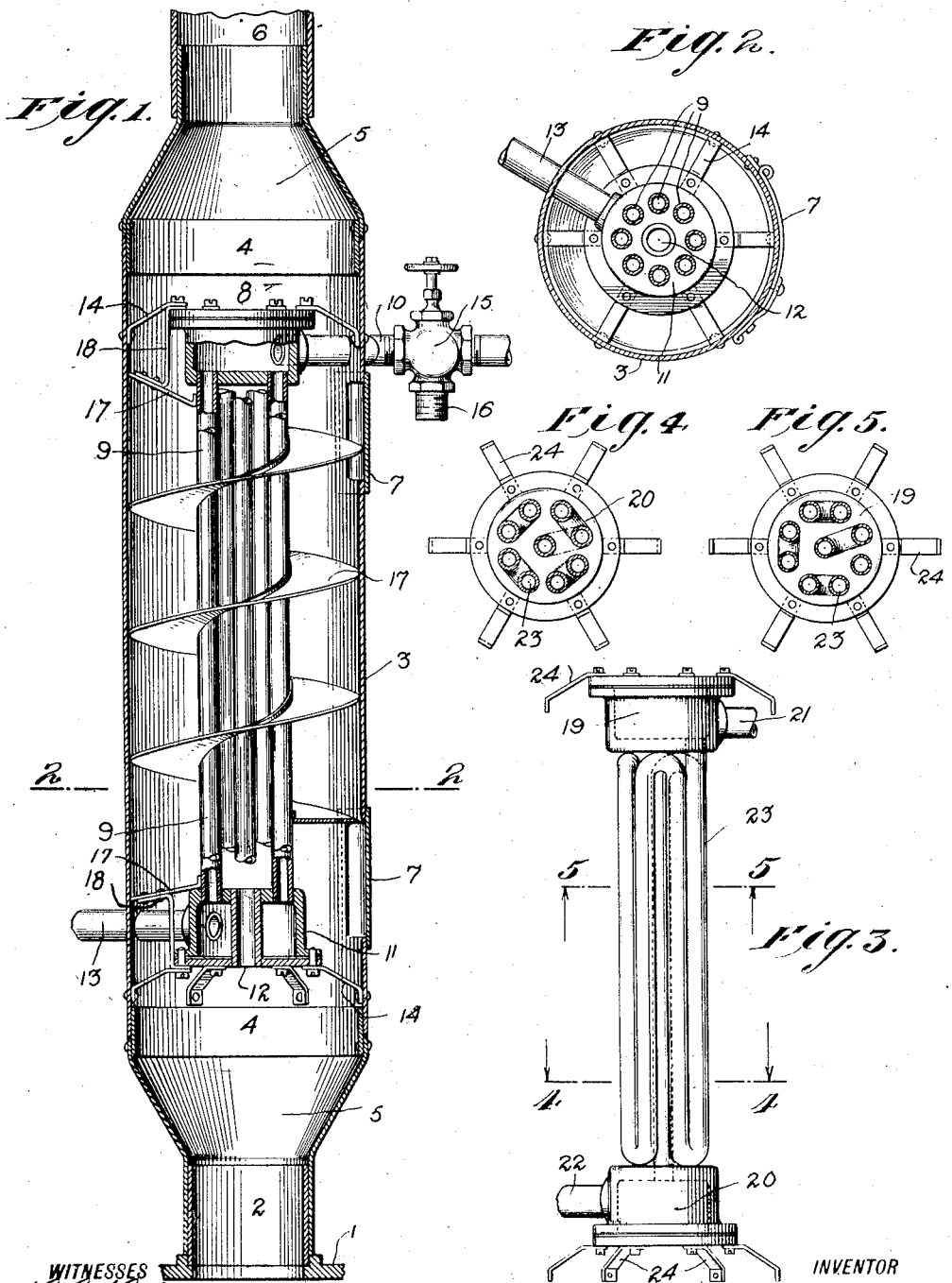
WITNESSES
INVENTOR
JULIUS BRAUNSTEIN
BY
ATTORNEYS

UNITED STATES PATENT OFFICE.

JULIUS BRAUNSTEIN, OF NEW YORK, N. Y.

FLUID-HEATER.

1,356,427.  Specification of Letters Patent.  Patented Oct. 19, 1920.

Application filed June 5, 1919. Serial No. 301,900.

*To all whom it may concern:*

Be it known that I, JULIUS BRAUNSTEIN, a citizen of the United States, and a resident of the city of New York, borough of Manhattan, in the county and State of New York, have invented a new and Improved Fluid-Heater, of which the following is a full, clear, and exact description.

This invention relates to a fluid heater, and aims more particularly to provide a device of this nature which shall utilize heat which is normally wasted, for the purpose of heating fluid, such as water, for any purpose desired.

A further object of this invention is the provision of a heater which may be interposed in the flue of a burner, stove, or other heating plant, which is adapted to absorb all of the heat possible from the products of combustion coming in contact with the same and to transmit such heat to fluid, such as water, which water may be stored in a tank and subsequently utilized for domestic purposes.

A still further object of the invention is the construction of a fluid heater which shall readily heat fluid, such as water, so that the water may be run through the same almost continuously and be drawn off warm.

Another object of this invention is the incorporation of construction which will render the cleaning of the heater very simple, in that all parts of the same are readily accessible.

A final object of the invention is the provision of a heater which shall be extremely simple in construction and, consequently, economical in manufacture.

Reference is had to the accompanying drawings which illustrate one practical embodiment of my invention, and in which—

Figure 1 is a side view partly in section of my preferred form of fluid heater;

Fig. 2 is a sectional view taken along line 2—2 of Fig. 1;

Fig. 3 is a side view of the heating unit of a modified form of construction; and Figs. 4 and 5 are sectional views taken along the lines 4 and 5 respectively of Fig. 3.

In all these various views like reference numerals designate similar parts, and the reference numeral 1 is the fireplate of an ordinary stove, or heater, over which the device may be directly positioned, if so desired, which is formed with the ordinary flue-pipe collar 2.

Over this connection there is positioned a casing, including a hollow, cylindrical shell, such as 3, which has removably secured to its ends, by means of flanged shoulders such as 4, funnel-shaped members, as indicated by the reference numeral 5. The lower of these funnel-shaped members 5 has its lower edges abutting against the upper surface of the fireplate 1, and is adapted to encircle the flue-pipe collar 2. The upper end of the upper funnel member 5 is connected to the continuation 6 of the flue in any suitable manner, care being taken, however, to prevent any great amount of leakage through the joints, which would tend to break the draft. The cylindrical shell 3 is provided with doors, such as 7, through which the interior of the shell and heating unit may be viewed and rendered accessible for cleaning purposes.

Suspended within such shell, by means hereinafter more fully specified, is the heating unit, which in Figs. 1 and 2 includes an upper hollow head, such as 8, which may be of any suitable construction as long as such head includes a chamber with which the upper open ends of the vertically-extending tubes 9 and the outlet pipe 10 communicate. The tubes 9 may be formed of any suitable material, but the same are preferably constructed of a good heat-conducting metal, such as copper.

The lower ends of the tubes 9 communicate with a second head, such as 11, which second head is formed with a centrally-extending opening 12 and an inlet pipe 13. The heads and associated tubes are suspended within the shell 3 by any suitable means, such as radially-extending fingers 14 which have their inner ends suitably secured to the heads 8 and 11 respectively, their outer ends being secured to the shell 3.

The outlet pipe 10 is preferably constructed with a combined cut-off and three-way valve 15, by means of which the fluid may be either entirely cut off, should the necessity arise, or, by attaching a hose to the outlet 16, the nozzle of the hose might be introduced through either of the doors 7, and any accumulation of soot deposited by the products of combustion may be flushed out of the shell 3.

If it is desired, the heating unit may have associated with it a certain construction hereinafter described, which will result in the products of combustion giving their heat more efficiently to the tubes 9. This construction referred to comprises simply a spirally arranged flange, such as 17, which may be supported within the shell 3 and around the tubes 9 by means of fingers, such as 18, having their inner ends connected to one of the fingers 14, or to any suitable part of the shell or the heads, and their outer ends secured adjacent to the upper and lower ends respectively of the flange 17.

In some instances, it may be desirable to produce water which is on the point of becoming steam, or is actually steam. To provide for this necessity, I have constructed a modified form of fluid heater, such as illustrated in Figs. 3, 4 and 5, which includes heads 19 and 20 with which the outlet and inlet pipes 21 and 22 are respectively connected. Contrary to the construction illustrated in Figs. 1 and 2, however, I provide a continuous pipe, such as 23, which has its lower end preferably centrally connected to the head 20, and extends thence as a continuous passage in the form of a zigzag between the heads 19 and 20, and has its upper, or outlet, end communicating with the head 19, with which the outlet pipe 21 communicates. In this modified form of construction fingers, such as 24, are also utilized for supporting the device within the shell.

In operation it will now be appreciated that the heating unit disclosed in connection with Figs. 1 and 2 might be made part of the usual fluid-heating system, that it might be in continuous circulation with a boiler, and that the same holds true in connection with the modified form illustrated in Figs. 3, 4 and 5.

It will be appreciated that in both of these forms the water enters through the inlet pipe and passes into the head. In the construction illustrated in Fig. 1, a great amount of water heated to a sufficiently high point for all practical purposes is provided by means of the water to be heated passing through the lower head and through the pipes 9 into the upper head, and thence through the outlet pipe 10 into a suitable storage tank. While this operation is taking place, the hot products of combustion are either passing directly upward between the shell 3 and the pipes 9 or between the pipes 9 by means of the opening 12, or, if the spiral flange 17 is applied, they will follow this flange, for a great part, and, thus, the heat otherwise wasted will be utilized.

In the construction illustrated in Figs. 3, 4, and 5, no where near such an amount of water is heated as in the preferred form of construction, but, as already pointed out, this water is heated to a great degree, and it might be found in some instances extremely practical to apply this construction, or heater, to a flue.

It is to be appreciated that although I have illustrated my fluid heater extending vertically, the same may be laid in a horizontal or a slightly inclined position, as my device is adaptable to all positions and conditions.

Further, any number of modifications might be resorted to in connection with my construction without in the least departing from the scope of my invention.

Having thus described my invention, I desire to claim:

1. A fluid heater, including a shell, an upper and lower head within said shell, heat-distributing tubes extending between said heads, inlet and outlet pipes secured to the lower and upper of said heads respectively, supporting fingers extending between such heads and the sides of the shell for properly retaining the heads in applied position, and a spiral flange extending between the upper and lower heads and around the tubes, such flange being retained in applied position by means of secondary fingers having one of their ends secured to the flange, their opposite ends being connected to one of the heads.

2. A fluid heater, including a shell formed with inlet and outlet openings, a fluid heating unit positioned within said shell, inlet and outlet pipes projecting through said shell and in communication with the fluid heating unit, said fluid heating unit being so formed as to cause a certain amount of the products of combustion to pass directly through such fluid heating unit from the shell inlet to the outlet, a spiral flange enveloping said unit, and within said shell, the remainder of such products of combustion following the said flange whereby they assume a circuitous route through said shell and in contact with said fluid heating unit.

3. A fluid heater, including a shell formed with inlet and outlet openings, a fluid heating unit positioned within said shell, said unit including heads, and tubes extending between and in communication with said heads, one of such heads being formed with a centrally extending opening through its body, the second head being imperforate, and inlet and outlet pipes projecting through said shell and in communication one with each of said heads respectively.

JULIUS BRAUNSTEIN.